B. Holly,
Water Wheel.

Nº 64,977. Patented May 21, 1867.

Witnesses
Jay Hyatt,
James Calkins

Inventor
Birdsill Holly
by J. Fraser & Co. Attys.

United States Patent Office.

BIRDSILL HOLLY, OF LOCKPORT, NEW YORK.

Letters Patent No. 64,977, dated May 21, 1867.

IMPROVEMENT IN TURBINE WATER-WHEELS.

*The Schedule referred to in these Letters Patent and making part of the same.*

TO ALL WHOM IT MAY CONCERN:

Be it known that I, BIRDSILL HOLLY, of Lockport, in the county of Niagara, and State of New York, have invented a new and useful Improvement in Turbine Water-Wheels; and I do hereby declare that the following is a full and exact description thereof, reference being had to the accompanying drawings, making part of this specification, in which—

Figure 1:
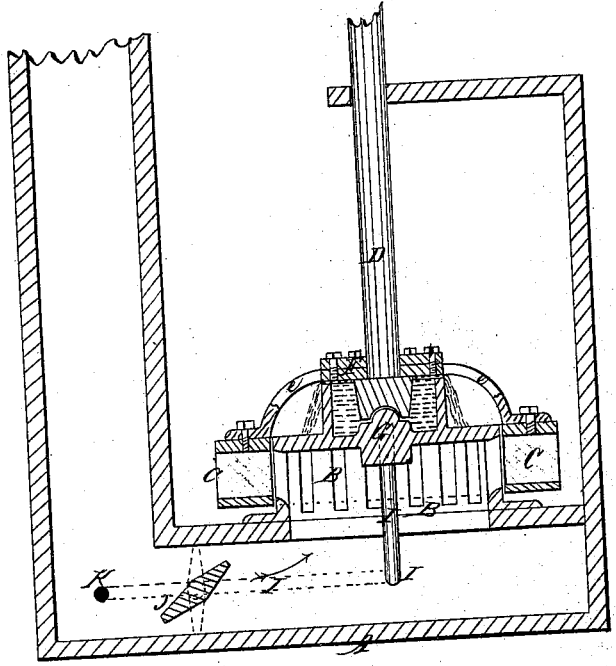

Figure 1 is a central vertical section of my improvement; and

Figure 2:
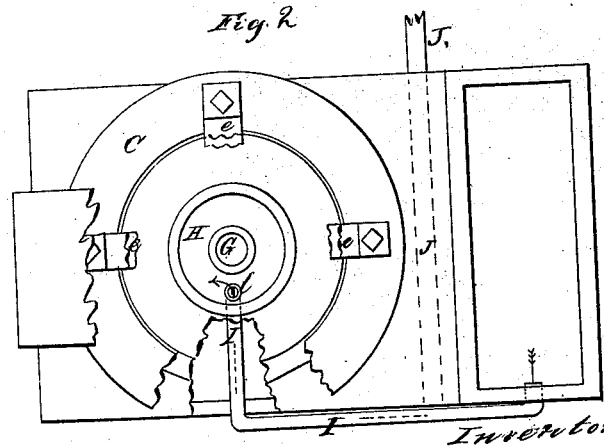

Figure 2 a plan view of the same with the shaft removed and portions broken away, showing the step and surrounding water-chamber and the manner of supplying the same with water.

The design of my improvement is to overcome the friction caused by the weight of the wheel and the perpendicular shaft of turbine and other water-wheels on their steps or bearings by means of hydrostatic pressure; and the invention consists in the construction and arrangement of the pressure-chambers surrounding the step or pivot with the disk against which the pressure is exerted, and the special arrangement for supplying the water to said chamber so as to maintain the pressure, whether the wheel is still or in operation.

In the drawings, A represents the flume, which supplies water to the wheel through the chamber B; C the wheel, secured to the shaft D in any suitable manner; that represented being arms $e\ e$ connecting the wheel with the hub or disk F of the shaft, to which the latter is firmly secured. G is the step or pivot upon which the shaft of the wheel revolves. H is a cylindrical hydrostatic chamber surrounding the pivot G, and supplied with water by means of the pipe I; and J is the gate for regulating the flow of water to the wheel. The pipe I is connected with the flume above or outside of the gate J, as represented at K, whence it extends outside of the flume to avoid the gate, shown in fig. 2 and in dotted lines, fig. 1, and enters again underneath the wheel, and, passing up through the passage B, empties into the chamber H through the bottom, represented at $l$, fig. 2. The area of said chamber or superficies of the disk F within the sides thereof must be such that the pressure of the water in the flume A, calculated by the height of the column, will slightly exceed the weight of the wheel and shaft to be supported, for reasons hereafter stated; and in constructing the wheel, the diameter of chamber H must be calculated from the height or head of the water supplied, according to the known laws of hydrostatic pressure.

The operation of my improvement is as follows: The water which is admitted into the chamber H by the pipe I keeps it always filled whether the wheel is in motion or not, and its pressure on the lower surface of the disk F is just sufficient to a little more than overcome the gravity of the wheel and shaft, so as to barely remove the shaft from contact with its pivot, and the disk F from contact with its seat, (the edge of the cylinder H,) the excess of water escaping through the small opening, and forming an equipoise to the weight of the wheel, which, when in motion, rotates on the thin cushion of the liquid that intervenes between the bearing surfaces at the pivot G and the disk F and its seat, as clearly shown in fig. 1. This arrangement is self-compensating as to any excess of hydrostatic pressure, as it is immediately relieved by the greater discharge of the water between the disk and the top of the chamber H, the discharging surface being so much greater than the area of the supply pipe I, which is comparatively small, that the least possible elevation of the disk above its normal position would instantly restore the equilibrium.

One of the advantages of my improvement, besides those already mentioned, is, that the wear, if any, occurs between the disk and its seat, will have the effect to make the joint more perfect, and render the operation of the device more effectual. By the arrangement of the pipe I, so as to receive its supply of water above the gate, the wheel is kept supported by the pressure of the water in H at all times, so that when the gate is opened, the wheel, being thus balanced, instantly commences its rotation, no power being expended in overcoming friction. Where the supply is received below the gate, or by means of a pump operated by the machinery, as soon as the water is shut off by closing gate J, the sustaining power or pressure of the water is removed, allowing the shaft to rest with the whole weight of the wheel upon its bearings; and, when the water is again let on, the wheel, instead of being supported, so as to commence its rotation freely with the first introduction or impulse of the water, remains at rest until sufficient power is exerted to overcome the inertia and friction of the wheel on its bearings. This subjects the pivot to wear and the machinery to a strain, which is a great objection, and one that is fully obviated by the use of my improvement. Where a stuffing-box is employed, or any device in which the joint of the pressure-chamber is produced by a cap fitting over a chamber, conical or otherwise, the slight vibration of the shaft soon wears the joint so as to greatly impair, if not entirely destroy the efficiency of the device, by failing to retain the water within the chamber. This defect is entirely remedied by my mode of construction, as any wear that may chance to occur in my arrangement has not the effect to increase the leakage, but rather to insure a more perfect joint between the sides of the chamber and the disk which covers it, so that too rapid an efflux of the water cannot occur.

What I claim as my invention, and desire to secure by Letters Patent, is—

Sustaining turbines and other wheels by means of a water-chamber H, and disk F, resting directly upon the sides thereof, both surrounding the step and shaft of the wheel, when supplied with water from the flume, and proportioned to the height thereof, substantially as set forth.

I also claim, in combination with said device, the supply pipe I, arranged for receiving the water from the outside of the stop-gate J, substantially in the manner and for the purpose set forth.

In witness whereof I have hereunto signed my name in the presence of two subscribing witnesses.

BIRDSILL HOLLY

Witnesses:
   J. K. McDONALD,
   GEO. BARNARD.